(12) United States Patent
Aguila

(10) Patent No.: US 6,626,415 B1
(45) Date of Patent: Sep. 30, 2003

(54) VALVE ASSEMBLY

(76) Inventor: Rafael A. Aguila, 36 Shelby St., Worcester, MA (US) 01605

( * ) Notice: Subject to any disclaimer, the term of this patent is extended or adjusted under 35 U.S.C. 154(b) by 222 days.

(21) Appl. No.: 09/910,255

(22) Filed: Jul. 20, 2001

(51) Int. Cl.[7] .............................................. F16K 31/45
(52) U.S. Cl. ...................... 251/61; 251/61.1; 251/61.3
(58) Field of Search ...................... 251/62, 63.4, 61, 251/61.3, 61.1; 92/89, 90; 417/507, 510

(56) References Cited

U.S. PATENT DOCUMENTS

| | | | |
|---|---|---|---|
| 1,276,279 A | * 8/1918 | Smith | 137/225 |
| 3,066,853 A | * 12/1962 | Landenberger | 417/360 |
| 3,441,245 A | * 4/1969 | Holland et al. | 251/5 |
| 4,214,727 A | 7/1980 | Baram | |
| 4,475,899 A | 10/1984 | Muller | |
| 4,535,967 A | 8/1985 | Babbitt et al. | |
| D287,268 S | 12/1986 | Hilpert et al. | |
| 4,672,988 A | * 6/1987 | Tash | 134/167 C |
| 5,769,387 A | 6/1998 | Perez | |
| 5,915,410 A | 6/1999 | Zajac | |

* cited by examiner

Primary Examiner—Edward K. Look
Assistant Examiner—John K. Fristoe, Jr.

(57) ABSTRACT

A valve assembly for controlling flow of gases and liquids includes a valve housing having a first end wall, a second end, and a peripheral wall such that a lumen is defined within the valve housing. Each of the first and second ends has an opening extending therethrough. A pipe extends into the lumen and is integrally coupled to the valve housing. The pipe has a free end positioned within the valve housing. A valve is positioned in the valve housing and is adapted for selectively opening and closing the opening in the first end wall. A resiliently expandable jacket is in fluid communication with the free end of the pipe. A pressurized fluid may be placed in communication with the pipe such that the resiliently expandable jacket expands to selectively position the valve in an open or closed position with respect to the opening in the first end wall.

15 Claims, 5 Drawing Sheets

VALVE ASSEMBLY

BACKGROUND OF THE INVENTION

1. Field of the Invention

The present invention relates to valve devices and more particularly pertains to a new valve assembly for controlling flow of gases and liquids.

2. Description of the Prior Art

The use of valve devices is known in the prior art. More specifically, valve devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,915,410; U.S. Pat. No. 4,475,899; U.S. Pat. No. 5,769,387; U.S. Pat. No. 4,214,727; U.S. Pat. No. 4,535,967; and U.S. Des. Pat. No. 287,268.

While these devices fulfill their respective, particular objectives and requirements, the aforementioned patents do not disclose a new valve assembly. The inventive device includes a valve housing having a first end wall, a second end, and a peripheral wall extending between the first and second ends walls such that a lumen is defined within the valve housing. Each of the first and second ends has an opening extending therethrough and into the lumen. A pipe extends through the peripheral wall and into the lumen. The pipe is integrally coupled to the valve housing at a juncture of the pipe and the peripheral wall. The pipe has a free end positioned within the valve housing. A valve is positioned in the valve housing and is adapted for selectively opening and closing the opening in the first end wall. A resiliently expandable jacket is in fluid communication with the free end of the pipe. A pressurized fluid may be placed in communication with the pipe such that the resiliently expandable jacket expands to selectively position the valve in an open or closed position with respect to the opening in the first end wall.

In these respects, the valve assembly according to the present invention substantially departs from the conventional concepts and designs of the prior art, and in so doing provides an apparatus primarily developed for the purpose of controlling flow of gases and liquids.

SUMMARY OF THE INVENTION

In view of the foregoing disadvantages inherent in the known types of valve devices now present in the prior art, the present invention provides a new valve assembly construction wherein the same can be utilized for controlling flow of gases and liquids.

The general purpose of the present invention, which will be described subsequently in greater detail, is to provide a new valve assembly apparatus and method which has many of the advantages of the valve devices mentioned heretofore and many novel features that result in a new valve assembly which is not anticipated, rendered obvious, suggested, or even implied by any of the prior art valve devices, either alone or in any combination thereof.

To attain this, the present invention generally comprises a valve housing having a first end wall, a second end, and a peripheral wall extending between the first and second ends walls such that a lumen is defined within the valve housing. Each of the first and second ends has an opening extending therethrough and into the lumen. A pipe extends through the peripheral wall and into the lumen. The pipe is integrally coupled to the valve housing at a juncture of the pipe and the peripheral wall. The pipe has a free end positioned within the valve housing. A valve is positioned in the valve housing and is adapted for selectively opening and closing the opening in the first end wall. A resiliently expandable jacket is in fluid communication with the free end of the pipe. A pressurized fluid may be placed in communication with the pipe such that the resiliently expandable jacket expands to selectively position the valve in an open or closed position with respect to the opening in the first end wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be iutilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new valve assembly apparatus and method which has many of the advantages of the valve devices mentioned heretofore and many novel features that result in a new valve assembly which is not anticipated, rendered obvious, suggested, or even implied by any of the prior art valve devices, either alone or in any combination thereof.

It is another object of the present invention to provide a new valve assembly which may be easily and efficiently manufactured and marketed.

It is a further object of the present invention to provide a new valve assembly which is of a durable and reliable construction.

An even further object of the present invention is to provide a new valve assembly which is susceptible of a low cost of manufacture with regard to both materials and labor, and which accordingly is then susceptible of low prices of sale to the consuming public, thereby making such valve assembly economically available to the buying public.

Still yet another object of the present invention is to provide a new valve assembly which provides in the apparatuses and methods of the prior art some of the advantages thereof, while simultaneously overcoming some of the disadvantages normally associated therewith.

Still another object of the present invention is to provide a new valve assembly for controlling flow of gases and liquids.

Yet another object of the present invention is to provide a new valve assembly which includes a valve housing having a first end wall, a second end, and a peripheral wall extending between the first and second ends walls such that a lumen is defined within the valve housing. Each of the first and second ends has an opening extending therethrough and into the lumen. A pipe extends through the peripheral wall and into the lumen. The pipe is integrally coupled to the valve housing at a juncture of the pipe and the peripheral wall. The pipe has a free end positioned within the valve housing. A valve is positioned in the valve housing and is adapted for selectively opening and closing the opening in the first end wall. A resiliently expandable jacket is in fluid communication with the free end of the pipe. A pressurized fluid may be placed in communication with the pipe such that the resiliently expandable jacket expands to selectively position the valve in an open or closed position with respect to the opening in the first end wall.

Still yet another object of the present invention is to provide a new valve assembly which uses all internal moving parts for controlling flow such that seals are not needed which may fail and cause a leak.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
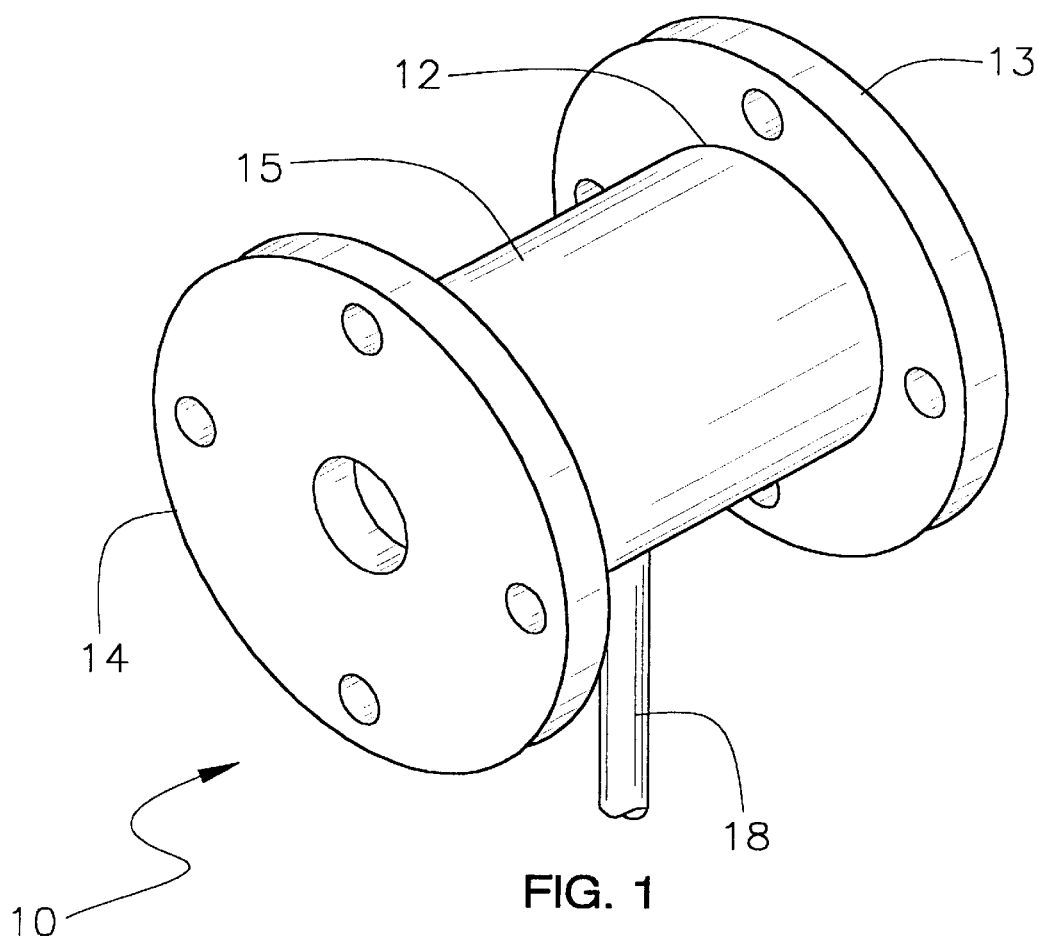
FIG. 1 is a schematic perspective view of a new valve assembly according to the present invention.

With reference now to the drawings, and in particular to FIGS. 1 through 8 thereof, a new valve assembly embodying the principles and concepts of the present invention and generally designated by the reference numeral 10 will be described.

Figure 2:
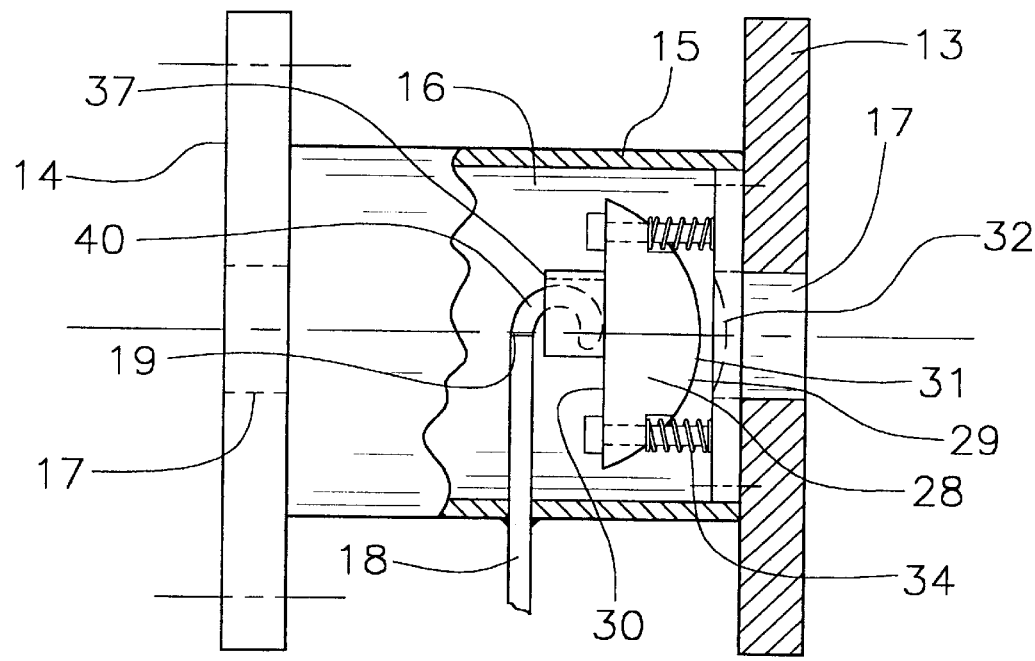
FIG. 2 is a schematic cross-sectional view of the first embodiment of the present invention.

As best illustrated in FIG. 2, the first embodiment of the valve assembly 10 generally comprises a valve housing 12 having a first end wall 13, a second end 14, and a peripheral wall 15 extending between first 13 and second 14 ends walls such that a lumen 16 is defined within the valve housing 12. Each of the first 13 and second 14 ends has an opening 17 extending therethrough and into the lumen 16.

A pipe 18 extends through the peripheral wall 15 and into the lumen 16. The pipe 18 is integrally coupled to the valve housing 12 at a juncture of the pipe 18 and the peripheral wall 15. The pipe 18 has a free end 19 positioned within the valve housing 12.

A valve 20 is positioned in the valve housing 12 and is adapted for selectively opening and closing the opening 17 in the first end wall 13. The valve 20 includes a plurality of guide rods 22 each having a first end 23 attached to an inner surface of the first end wall 13 and a second end 24 extending away from the first end wall 13. Each of the second ends 24 has a bulbous member 25 thereon.

A plate 28 is movably positioned on the guide rods 22 such that the guide rods 22 extend through the plate 28. The plate 28 is movable between the first end wall 13 and the bulbous members 25. The plate 28 has a first surface 29 facing the first end wall 13 and a second surface facing 30 the bulbous members 25. The first surface 29 has a convex shape such that an apex 31 is defined. The apex 31 is extendable into the opening in the first end wall, as shown by dotted lined 32, such that a seal may be formed by the first surface 29 and an edge of the opening 17 in the first end wall 13.

A plurality of biasing members 34 biases the plate 28 away from the first end wall 13. Each of the biasing members 34 comprises a spring positioned one of the guide rods 22. Each of the springs 34 is positioned between the first end wall 13 and the first surface 29 of the plate 28. The first surface 29 has a plurality of depressions 35 therein. Each of the depressions 35 is positioned for receiving one of the springs 34.

A sleeve 36 is attached to the second surface 30 of the plate 28. The sleeve 36 has an open distal end 37 with respect to the plate 28.

A resiliently expandable jacket 40 is in fluid communication with the free end 19 of the pipe 18. The resiliently expandable jacket 40 extends into the open end 37 of the sleeve 36. The resiliently expandable jacket 40 preferably comprises a flexible coiled tubular member. The tubular member uncoils when in communication with a pressurized fluid.

In the first embodiment, a pressurized fluid may be placed in communication with the pipe 18 such that the resiliently expandable jacket 40 uncoils. When the jacket 40 uncoils, the plate 40 is urged toward the first end wall 13 such that the first surface 29 forms a seal over the opening 17 in the first end wall 13 and fluids may not pass through the valve housing.

Figure 4:
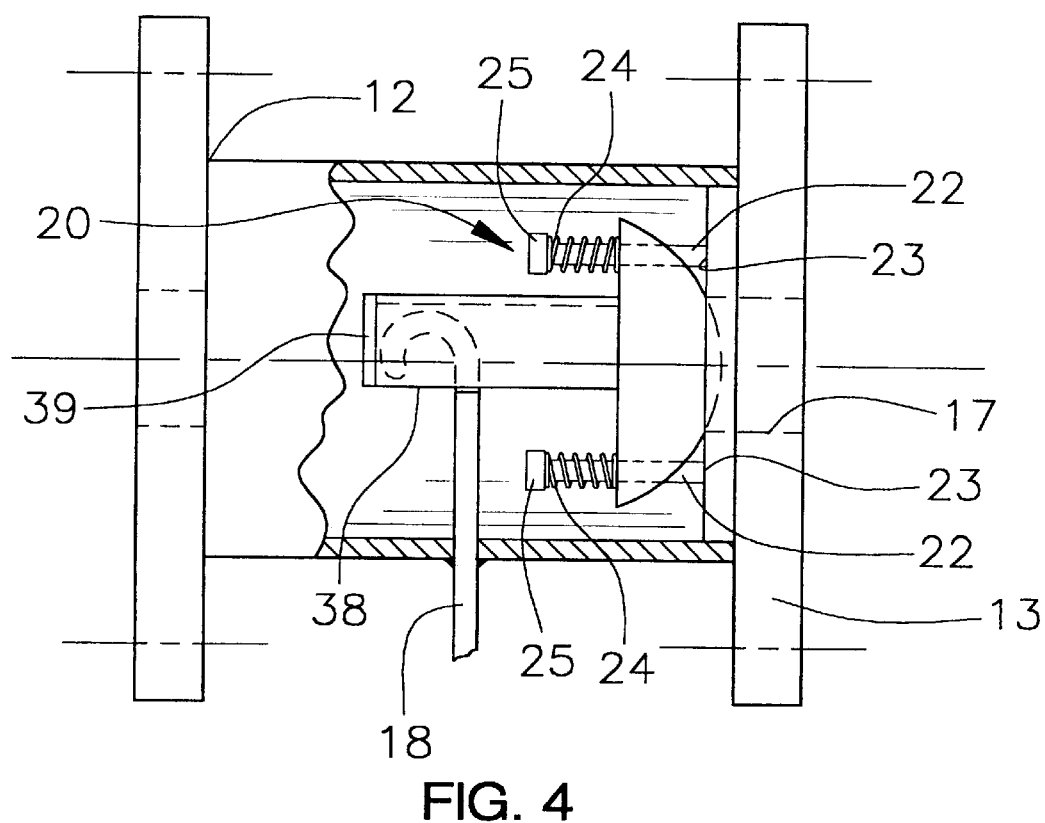
FIG. 4 is a schematic cross-sectional view of the second embodiment present invention.

The second embodiment is depicted in FIG. 4. The variation is primarily in the sleeve 36 and biasing members 34. The biasing members 34 bias the plate 28 toward the first end wall 13 such that the plate 28 covers the opening 17 in the first end wall 13. The sleeve 36 of the second embodiment has an open side wall 38 facing the pipe 18 and a closed distal end 39 with respect to the plate 28. The resiliently expandable jacket 40 extends into the open side wall 38 such that the pipe 18 is movable along the sleeve 36 as the sleeve 36 moves with respect to valve housing 12. The resiliently expandable jacket 40 abuts and is expandable in the direction of the closed end 39. The expansion of the jacket pushes on the distal end 39 of the sleeve 36 and urges the plate 28 away from the first end wall such that the plate 28 does not close the opening 17 in the first end wall 13.

Figure 3:
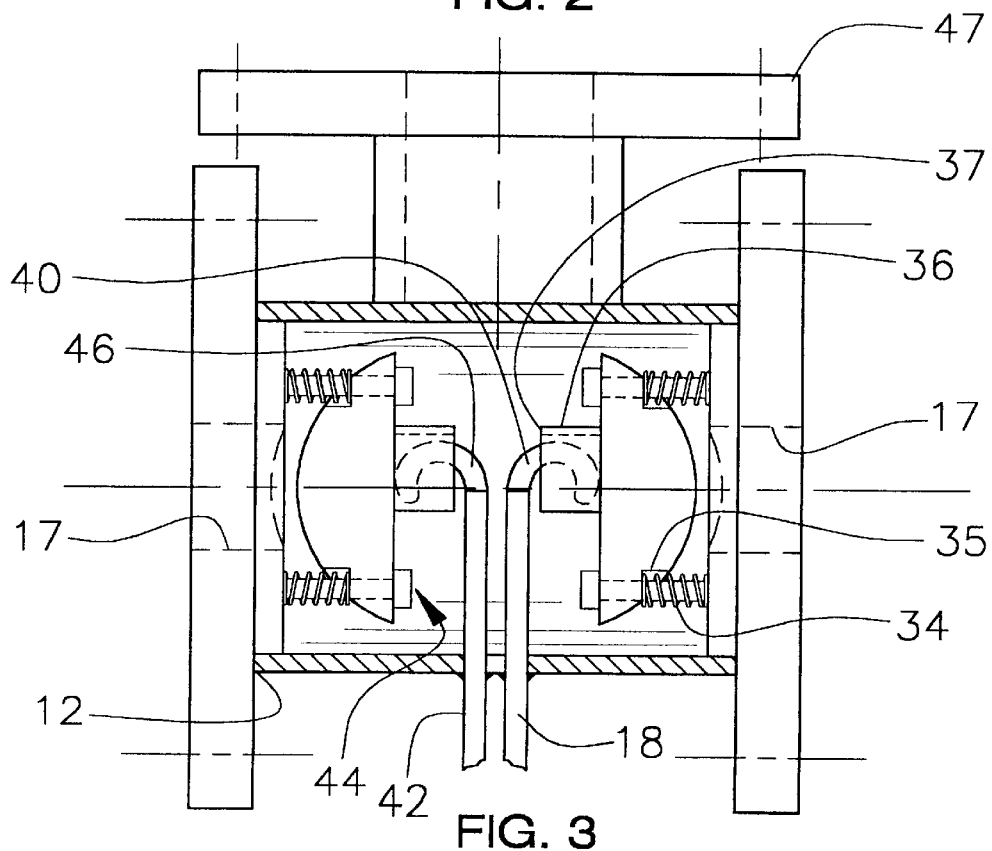
FIG. 3 is a schematic cross-sectional view of the third embodiment of the present invention.

The third embodiment is depicted in FIG. 3 and incorporates a second pipe 42, second valve 44 and second resiliently expandable jacket 46. The second valve 44 is directed toward the second end wall 14 and allows a user to selectively close either or both of the openings 17 in the valve housing 12. FIG. 3 also shows another conduit 47 being coupled to the valve housing.

Figure 7:
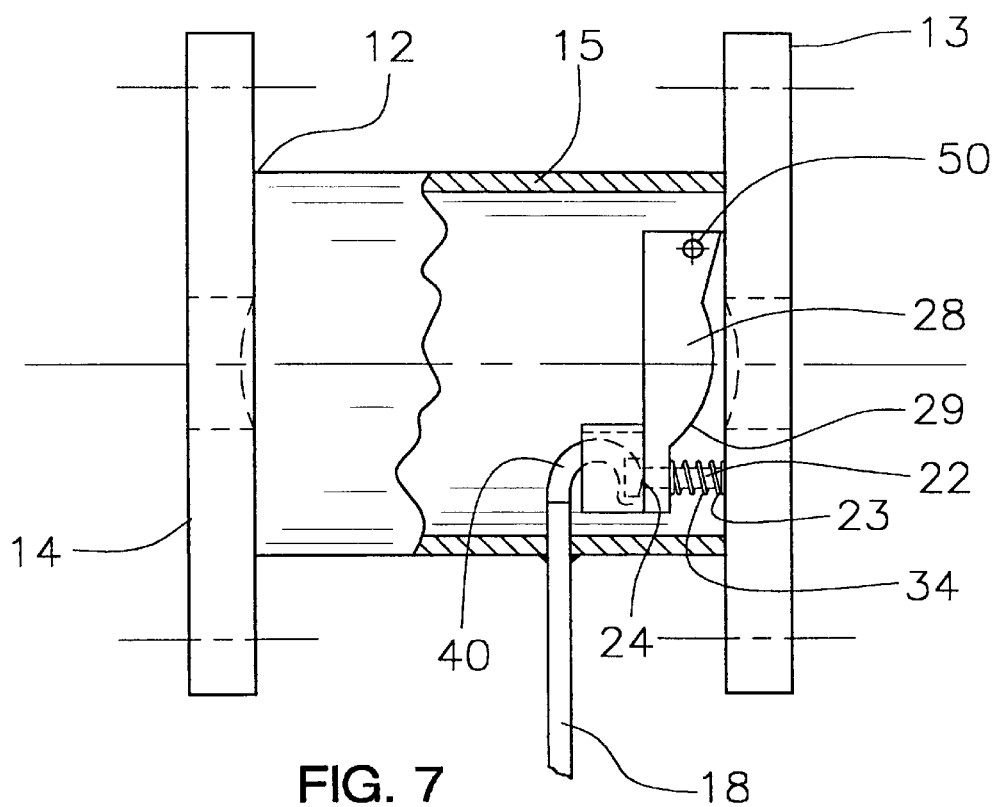
FIG. 7 is a schematic cross-sectional view of the fourth embodiment present invention.

The fourth embodiment is depicted in FIG. 7. In the fourth embodiment a pin 50 is positioned in the valve housing 12 and positioned generally adjacent to the first end wall 13 between the opening 17 and the peripheral wall 15. The pin 50 has a longitudinal axis orientated generally perpendicular to an axis of the opening 17 in the first end wall 13.

A guide rod 22 has a first end 23 attached to an inner surface of the first end wall 13 and a second end 24 extending away from the first end wall 13. The guide rod 22 is positioned generally between the opening 17 and the peripheral wall 15 and is located on an opposite side of the opening 17 with respect to the pin 50. The plate 28 of the fourth embodiment has a first surface 29 facing the first end wall 13. The first surface 29 has a convex shape such that an apex 31 is defined. The plate 28 is hingedly attached to the pin 50 such that the apex 31 is extendable into the opening 17 in the first end wall 13 whereby a seal may be formed by the first surface 29 and the edge of the opening 17 in the first end wall 13. The guide rod 22 extends through the plate 28 such that the plate 28 is movable along the guide rod 22.

The biasing member 34 in the fourth embodiment biases the plate 28 away from the first end wall 13 and comprises a spring positioned on the guide rod 22 and located between the first end wall 13 and the plate 28.

The resiliently expandable jacket 40 abuts a second surface 30 of the plate 28 such that the first surface 29 of the plate 28 is urged toward the first end wall 14 when the pressurized fluid is introduced into the resiliently expandable jacket 40.

Figure 5:
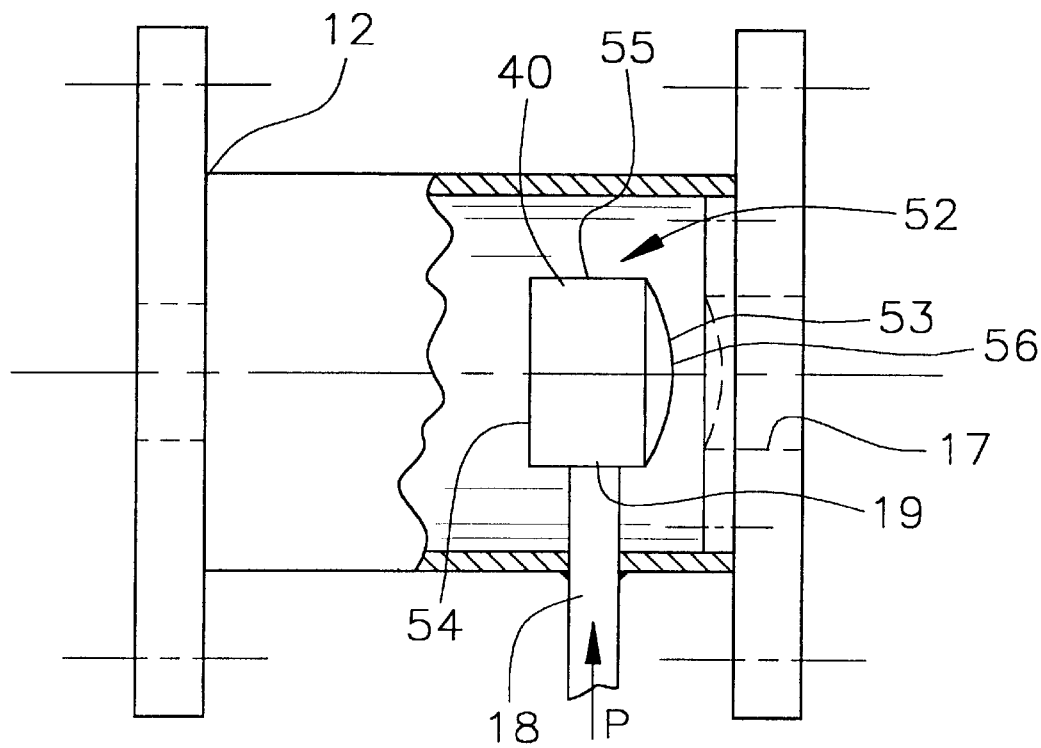
FIG. 5 is a schematic cross-sectional view of the fifth embodiment present invention.

The fifth embodiment utilizes the expandable jacket 40 in place of the plate 28. The fifth embodiment is shown in FIG. 5. The pressurized fluid expands the jacket 40 so that jacket 40 itself covers the opening 17 in the first end wall 13. Preferably, the jacket in the fifth embodiment comprises a cylindrical member 52 having a first end 53, a second end 54 and perimeter wall 55 extending between the first 53 and second 54 ends. The first end 53 of the cylindrical member 52 faces the first end wall 13. The first end 53 has a convex shape. The perimeter wall 55 is resiliently stretchable. An apex 56 of the first end 53 of the cylindrical member 52 extends into the opening 17 of the first end wall 13 when pressurized fluid is introduced into the cylindrical member such that a seal is formed between the first end 53 and an edge of the opening 17.

Figure 6:
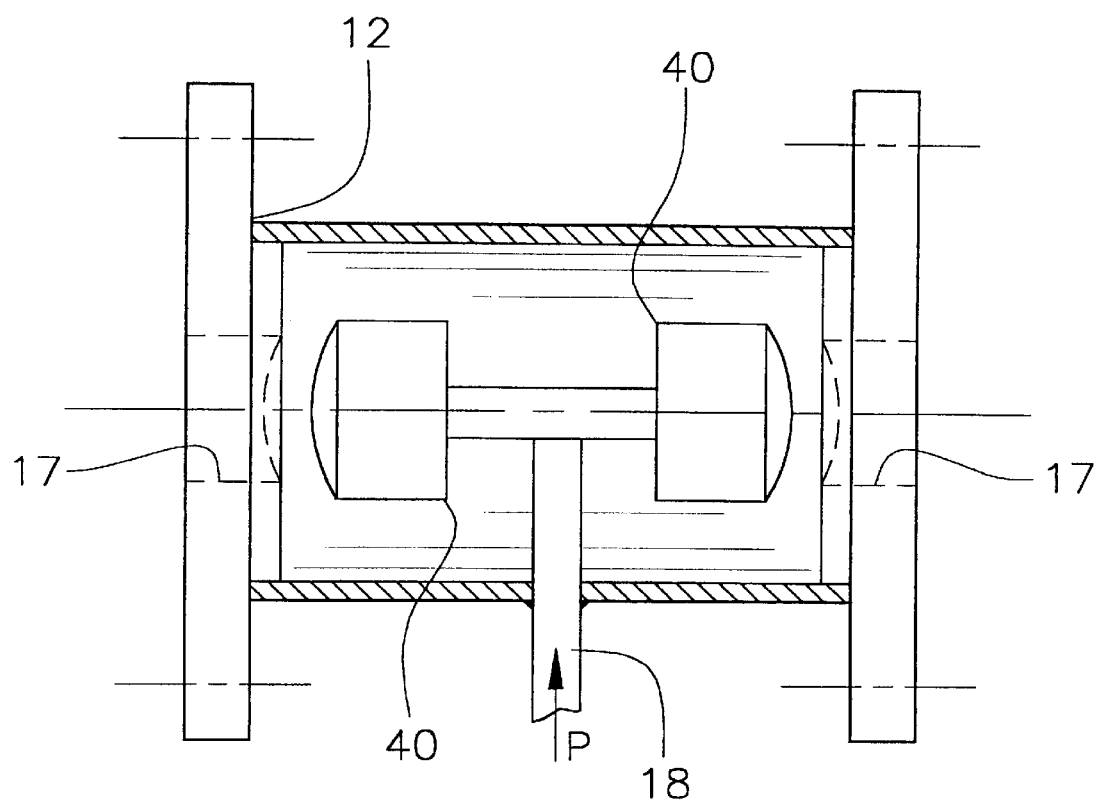
FIG. 6 is a schematic cross-sectional view of the sixth embodiment present invention.

The sixth embodiment is depicted in FIG. 6 and uses a pair of expandable jackets 40 which may be used to cover each of the openings 17 in the valve housing 12.

Figure 8:
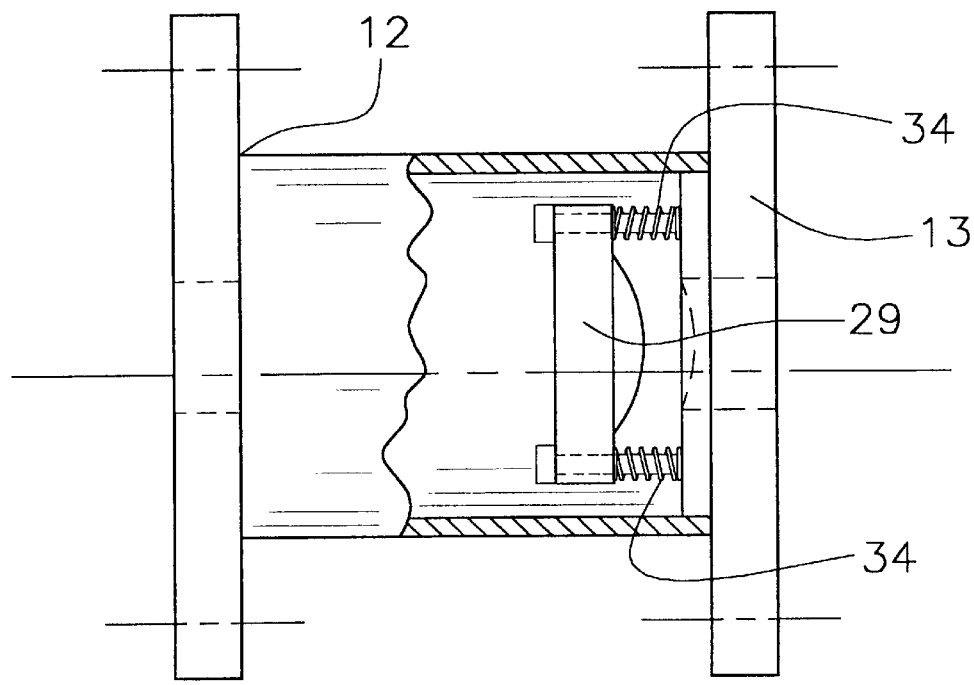
FIG. 8 is a schematic cross-sectional view of the magnetic version of the present invention.

Also envisioned is a magnetically controlled valve as depicted in FIG. 8. The biasing members 34 bias the plate 29 away from the first end wall 13 which may be selectively magnetized for pulling the plate 29 toward the first end wall 13.

In use, the device 10 is used as a conventional valve for controlling the flow of a liquid or a gas. The device 10 uses hydraulic of pneumatic power to open and close a valve 20. The pipe 18 is integrally sealed to the valve housing 12 so no moving parts are passing through the peripheral wall 15 of the valve housing 12. Conventional valves have valve stems or other actuators for actuating valve. These actuators extend through the peripheral wall and require seals. These seals may eventually fail and allow the escape of hazardous gases or liquids. Since the moving parts of the current device 10 are all internal, no seals are needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sealed valve assembly comprising:
    a valve housing having a first end wall, a second end, and a peripheral wall extending between first and second ends walls such that a lumen is defined within said valve housing, each of said first and second ends having an opening extending therethrough and into said lumen;
    a pipe extending through said peripheral wall and into said lumen, said pipe being integrally coupled to said valve housing at a juncture of said pipe and said peripheral wall, said pipe having a free end positioned within said valve housing;
    a resiliently expandable jacket being in fluid communication with said free end of said pipe; and
    wherein a pressurized fluid may be placed in communication with said pipe such that said resiliently expandable jacket expands such that said opening in said first wall is covered whereby fluids may not travel through said valve housing.

2. The sealed valve assembly as in claim 1, wherein said resiliently expandable jacket comprises a cylindrical member having a first end, a second end and perimeter wall extending between said first and second ends, said first end of said cylindrical member facing said first end wall, said first end having a convex shape, said perimeter wall being resiliently stretchable, wherein an apex of said first end of said cylindrical member extends into said opening of said first end wall when pressurized fluid is introduced into said cylindrical member such that a seal is formed between said first end and an edge of said opening.

3. A sealed valve assembly comprising:
    a valve housing having a first end wall, a second end, and a peripheral wall extending between first and second ends walls such that a lumen is defined within said valve housing, each of said first and second ends having an opening extending therethrough and into said lumen;

a pipe extending through said peripheral wall and into said lumen, said pipe being integrally coupled to said valve housing at a juncture of said pipe and said peripheral wall, said pipe having a free end positioned within said valve housing;

a valve being positioned in said valve housing and being adapted for selectively opening and closing said opening in said first end wall;

a resiliently expandable jacket being in fluid communication with said free end of said pipe; and wherein a pressurized fluid may be placed in communication with said pipe such that said resiliently expandable jacket expands to selectively position said valve in an open or closed position with respect to said opening in said first end wall.

4. The sealed valve assembly as in claim 3, wherein said valve comprises:

a plurality of guide rods each having a first end attached to an inner surface of said first end wall and a second end extending away from said first end wall;

a plate being movably positioned on said rods such that said rods extend through said plate, said plate having a first surface facing said first end wall, said first surface having a convex shape such that, an apex is defined, said apex being extendable into said opening in said first end wall such that a seal may be formed by said first surface and an edge of said opening in said first end wall;

a plurality of biasing members bias said plate away from said first end wall; and said resiliently expandable jacket abutting a second surface of said plate such that said first surface of said plate is urged toward said first end wall when the pressurized fluid is introduced into said resiliently expandable jacket.

5. The sealed valve assembly as in claim 4, further including a sleeve being attached to said second surface of said plate, said sleeve having an open distal end with respect to said plate, said resiliently expandable jacket extending into said open end of said sleeve.

6. The sealed valve assembly as in claim 5, wherein said resiliently expandable jacket comprises a flexible coiled tubular member.

7. The sealed valve assembly as in claim 3, wherein each of said rods has a second end having a bulbous member thereon, said plate being movable between said first end wall and said bulbous members, each of said biasing members comprising a spring positioned on one of said guide rods, each of said springs being positioned between said first end wall and said plate.

8. The sealed valve assembly as in claim 3, wherein said valve comprises:

a plurality of guide rods each having a first end attached to an inner surface of said first end wall and a second end extending away from said first end wall;

a plate being movably positioned on said rods such that said rods extend through said plate, said plate having a first surface facing said first end wall, said first surface having a convex shape such that an apex is defined, said apex being extendable into said opening in said first end wall such that a seal may be formed by said first surface and an edge of said opening in said first end wall;

a plurality of biasing members bias said plate toward said first end wall such that said plate covers said opening in said first wall; and a sleeve being attached to said second surface of said plate, said sleeve having an open side wall facing said pipe and a closed distal end with respect to said plate, said resiliently expandable jacket extending into said open side wall such that said pipe is movable along said sleeve, said resiliently expandable jacket abutting and being expandable in the direction of said closed end, wherein said expansion of said jacket urges said plate away from said first end wall such that said plate does not close said opening in said first end wall.

9. The sealed valve assembly as in claim 8, wherein said resiliently expandable jacket comprises a flexible coiled tubular member.

10. The sealed valve assembly as in claim 8, wherein each of said rods has a second end having a bulbous member thereon, said plate being movable between said first end wall and said bulbous members, each of said biasing members comprising a spring positioned on one of said guide rods, each of said springs being positioned between said plate and said bulbous members.

11. The sealed valve assembly as in claim 3, further including:

a second pipe extending through said peripheral wall and into said lumen, said second pipe being integrally coupled to said valve housing at a juncture of said second pipe and said peripheral wall, said second pipe having a free end positioned within said valve housing;

a second valve being positioned in said valve housing and being adapted for selectively opening an d closing said opening in said second end wall;

a second resiliently expandable jacket being in fluid communication with said free end of said second pipe; and wherein a pressurized fluid may be placed in communication with said second pipe such that said second resiliently expandable jacket expands to selectively position said second valve in an open or closed position with respect to said opening in said second end wall.

12. The sealed valve assembly as in claim 4, further including:

a second pipe extending through said peripheral wall and into said lumen, said second pipe being integrally coupled to said valve housing at a juncture of said second pipe and said peripheral wall, said second pipe having a free end positioned within said valve housing;

a second valve being positioned in said valve housing and being adapted for selectively opening and closing said opening in said second end wall, said second valve comprising;

a plurality of guide rods each having a first end attached to an inner surface of said second end wall and a second end extending away from said second end wall;

a second plate being movably positioned on said rods such that said rods extend through said second plate, said second plate having a first surface facing said second end wall, said second surface having a convex shape such that an apex is defined, said apex being extendable into said opening in said second end wall such that a seal may be formed by said first surface and an edge of said opening in said second end wall;

a plurality of biasing members bias said second plate away from said first end wall;

a second resiliently expandable jacket being in fluid communication with said free end of said second pipe; and wherein a pressurized fluid may be placed in communication with said second pipe such that said second resiliently expandable jacket expands to selectively position said second valve in an open or closed position with respect to said opening in said second end wall.

13. The sealed valve assembly as in claim 12, wherein each of said first and second resiliently expandable jackets comprises a flexible coiled tubular member.

14. The sealed valve assembly as in claim 3, wherein said valve comprises:

a pin being positioned in said valve housing and positioned generally adjacent to said first end wall between said opening and said peripheral wall, said pin having a longitudinal axis orientated generally perpendicular to an axis of said opening in said first wall;

a guide rod having a first end attached to an inner surface of said first end wall and a second end extending away from said first end wall, said guide rod being positioned generally between said opening and said peripheral wall and being located on an opposite side of the opening with respect to said pin;

a plate having a first surface facing said first end wall, said first surface having a convex shape such that an apex is defined, said first plate being hingedly attached to said pin such that said apex is extendable into said opening in said first end wall whereby a seal may be formed by said first surface and an edge of said opening in said first end wall, said guide rod extending through said plate such that said plate is movable along said guide rod;

a biasing members biases said plate away from said first end wall, said biasing member comprising a spring positioned on said guide rod and located between said first end wall and said plate; and said resiliently expandable jacket abutting a second surface of said plate such that said first surface of said plate is urged toward said first end wall when the pressurized fluid is introduced into said resiliently expandable jacket.

15. A sealed valve assembly comprising:

a valve housing having a first end wall, a second end, and a peripheral wall extending between first and second ends walls such that a lumen is defined within said valve housing, each of said first and second ends having an opening extending therethrough and into said lumen;

a pipe extending through said peripheral wall and into said lumen, said pipe being integrally coupled to said valve housing at a juncture of said pipe and said peripheral wall, said pipe having a free end positioned within said valve housing;

a valve being positioned in said valve housing and being adapted for selectively opening and closing said opening in said first end wall, said valve comprising;

a plurality of guide rods each having a first end attached to an inner surface of said first end wall and a second end extending away from said first end wall, each of said guide rods having a second end having a bulbous member thereon;

a plate being movably positioned on said rods such that said rods extend through said plate, said plate being movable between said first end wall and said bulbous members, said plate having a first surface facing said first end wall and a second surface facing said bulbous members, said first surface having a convex shape such that an apex is defined, said apex being extendable into said opening in said first end wall such that a seal may be formed by said first surface and an edge of said opening in said first end wall;

a plurality of biasing members bias said plate away from said first end wall, each of said biasing members comprising a spring positioned one of said guide rods, each of said springs being positioned between said first end wall and said first surface of said plate, said first surface having a plurality of depressions therein, each of said depressions being positioned for receiving one of said springs;

a sleeve being attached to said second surface of said plate, said sleeve having an open distal end with respect to said plate;

a resiliently expandable jacket being in fluid communication with said free end of said pipe, said resiliently expandable jacket extending into said open end of said sleeve, said resiliently expandable jacket comprising a flexible coiled tubular member; and wherein a pressurized fluid may be placed in communication with said pipe such that said resiliently expandable jacket uncoils whereby by said plate is urged toward said first end wall such that said first surface forms a seal over said opening in said first end wall and fluids may not pass through said valve housing.

* * * * *